M. DREXL.
MEANS FOR PROPELLING VEHICLES, VESSELS, OR THE LIKE.
APPLICATION FILED JAN. 16, 1913.
1,069,238.
Patented Aug. 5, 1913.
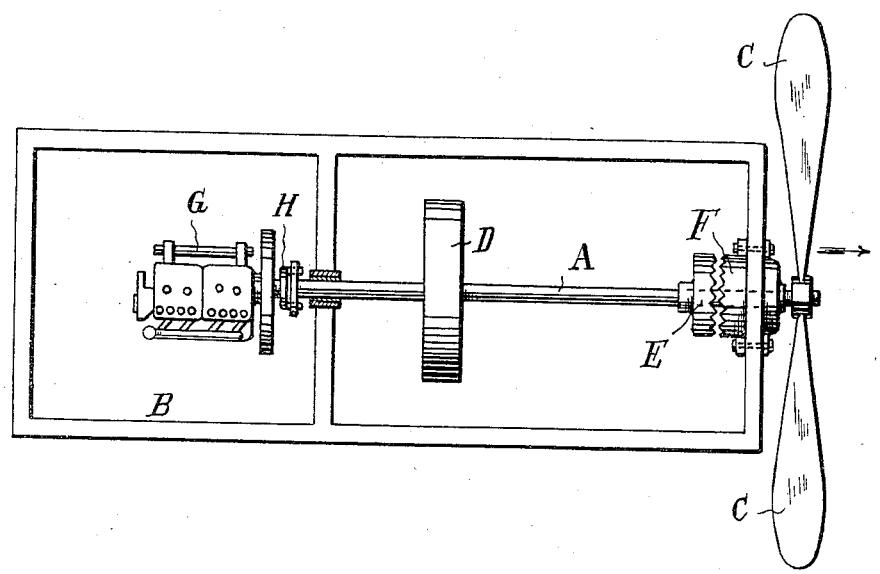

UNITED STATES PATENT OFFICE.

MARTIN DREXL, OF BUENOS AIRES, ARGENTINA.

MEANS FOR PROPELLING VEHICLES, VESSELS, OR THE LIKE.

1,069,238.  Specification of Letters Patent.  Patented Aug. 5, 1913.

Application filed January 16, 1913. Serial No. 742,491.

*To all whom it may concern:*

Be it known that I, MARTIN DREXL, of 1555 Mansilla street, Buenos Aires, Argentina, South America, parson, a subject of the Emperor of Germany, have invented new and useful Improved Means for Propelling Vehicles, Vessels, or the Like, of which the following is a specification.

My invention relates to improvements in means for propelling vehicles vessels or the like and consists in means whereby the pull, thrust or tractive force whereby the vehicle vessel or the like is propelled is transmitted thereto in a series of intermittent impulses whose strength or intensity is augmented or increased by reason of the interval between the impulses during which the prime mover or motor acts freely to store up energy in the apparatus for transmission to the body or frame of the vehicle, vessel or the like by the impulse to propel the vehicle, vessel or the like.

According to my invention I arrange the shaft upon which the screw fan or other propeller is mounted so as to have a suitable amount of freedom or end-play so that it may be made to reciprocate axially so as to impart the tractive force of the propeller to the frame or body of the vehicle in a series of impulses. This may be effected by mounting a pair of collars one upon the shaft and the other upon the fixed frame or body of the vehicle, vessel or the like. The opposed faces of these collars are serrated or provided with a series of radial teeth having inclined faces. A fly wheel, gyroscope or other device is mounted on the propeller shaft which is connected to the prime mover or motor by means of a suitable coupling.

On the prime mover or motor acting to rotate the propeller shaft, the tractive force of the propeller acts only to move forward the shaft and fly wheel, gyroscope or other device thereon, until the opposed faces on the collars (one on the shaft and the other on the body or frame of the vehicle, vessel or the like) come in contact. When the collars come in contact, the energy stored up in the propeller propeller-shaft and devices thereon, is transmitted to the frame or body of the vessel, vehicle or the like together with the tractive force exerted by the propeller during the period of contact and the wedging action due to the inclination of the teeth on the opposed faces of the collars.

My invention may be applied to the propulsion of ships or vessels, automobiles or land vehicles, aeroplanes, airships, helicopters or vertical lift aerial vessels or other purposes, and acts in the manner of an automatic change gear or speed reducing means, whereby should the vessel, vehicle or the like encounter an increased resistance to propulsion my device will automatically effect a corresponding reduction in speed and increase the intensity of the impulses whereby the increased resistance is automatically overcome by a reduction in speed.

In order that my invention may be more readily understood reference is had to the accompanying drawing in which the diagrammatic illustration indicates a method of carrying out my invention.

Referring to the drawing A is the propeller shaft mounted in bearings in the frame B of the vehicle, vessel or the like so as to have a suitable amount of end-play or movement in an axial direction.

C is a screw propeller and D is a fly wheel both mounted on the shaft A.

E and F are the collars on the shaft A and frame B respectively and are provided on their opposed faces with radial serrations or teeth having inclined faces which act to cause the intermittent axial movement of the shaft when the propeller is rotated.

G indicates the prime mover or motor connected to the propeller shaft A through the coupling H.

Having now particularly described and ascertained the nature of my said invention and in what manner the same is to be performed, I declare that what I claim is:—

Means for propelling vehicles, vessels or the like consisting of a propeller mounted on a shaft having a certain amount of end play, a pair of collars one on the shaft and one on the frame or body of the vehicle, vessel or the like, whose opposed faces are provided with serrations or teeth to cause the shaft to intermittently move in an axial direction to transmit the tractive force of the propeller to the vehicle, vessel or the like in a series of impulses.

In testimony whereof I affix my signature in presence of two witnesses.

MARTIN DREXL.

Witnesses:
 ELI TAYLOR,
 ALBERT G. EBERT.

Copies of this patent may be obtained for five cents each, by addressing the "Commissioner of Patents Washington, D. C."